United States Patent
Kamp et al.

(10) Patent No.: US 11,686,601 B2
(45) Date of Patent: Jun. 27, 2023

(54) SENSOR SYSTEM AND METHOD FOR POSITION OR ANGLE DETECTION

(71) Applicant: Honeywell International Inc.

(72) Inventors: Christian Kamp, Osnabrück (DE); Thomas Lampe, Ibbenbüren (DE); Tobias Fechtel, Ibbenbüren (DE); Mathias Grewe, Rheine (DE)

(73) Assignee: Honeywell International Inc., Charlotte, NC (US)

( * ) Notice: Subject to any disclaimer, the term of this patent is extended or adjusted under 35 U.S.C. 154(b) by 226 days.

(21) Appl. No.: 17/026,137

(22) Filed: Sep. 18, 2020

(65) Prior Publication Data
US 2022/0090943 A1    Mar. 24, 2022

(51) Int. Cl.
G01D 5/20 (2006.01)
(52) U.S. Cl.
CPC .................... G01D 5/2053 (2013.01)
(58) Field of Classification Search
CPC ........ G01D 5/2053; G01D 5/20; G01D 5/206; G01D 3/08
USPC .................................................. 324/207.17
See application file for complete search history.

(56) References Cited

U.S. PATENT DOCUMENTS

| | | | |
|---|---|---|---|
| 4,718,445 A | 1/1988 | Lundberg et al. | |
| 6,212,783 B1 | 4/2001 | Ott et al. | |
| 8,550,115 B2 | 10/2013 | Emanuel et al. | |
| 8,710,827 B2 | 4/2014 | Zhitomirsky | |
| 9,182,251 B2 | 11/2015 | Shinohara | |
| 9,599,997 B2 * | 3/2017 | Eickhoff | F16K 27/029 |
| 10,502,592 B2 | 12/2019 | Fontanet et al. | |
| 2003/0206007 A1 | 11/2003 | Gass et al. | |
| 2004/0085063 A1 | 5/2004 | Jin et al. | |
| 2019/0234759 A1 | 8/2019 | Deshaies et al. | |

FOREIGN PATENT DOCUMENTS

EP    1828722 B1    11/2011

OTHER PUBLICATIONS

Elizabeth Coon et al., "Laser sensor motion control system with application to engine valve seat metrology Final Report", Dec. 11, 2007.
Wikipedia, "LC Circuit", Retrieved from "https://en.wikipedia.org/w/index.php?title=LC_circuit&oldid=973176445", page was last edited on Aug. 15, 2020, at 20:20 (UTC).
Pavel Ripka and Michal Janosek, "Advances in Magnetic Field Sensors", IEEE Sensors Journal, vol. 10, No. 6, Jun. 2010.
European search Report for corresponding EP Application No. 21196139.6.

* cited by examiner

Primary Examiner — Lee E Rodak
Assistant Examiner — Rahul Maini
(74) Attorney, Agent, or Firm — Ortiz & Lopez, PLLC; Luis M. Ortiz; Kermit D. Lopez

(57) ABSTRACT

A sensor system and method of operating the sensor system can include an indicator that is operable in resonance, the indicator being connected to a movable element of an actuator, and a sensor including sensor windings arranged in direct proximity to the indicator and external to a closed housing. The sensor can receive a position or an angle of the indicator, and can measure the position or the angle of the movable element inside the actuator through the closed housing based on inductive resonance facilitated by the indicator.

19 Claims, 3 Drawing Sheets

SENSOR SYSTEM AND METHOD FOR POSITION OR ANGLE DETECTION

TECHNICAL FIELD

Embodiments relate to industrial sensors and field devices. Embodiments further relate to sensor systems for detecting and measuring the angle or position of an actuator. Embodiments further relate to oscillator circuits and fail-safe systems implemented in industrial processing facilities such as manufacturing plants. Embodiments also relate to sensors that can detect and read the position, velocity, and/or rotation associated with control valves.

BACKGROUND

In industrial process control environments such as manufacturing plants and hydrocarbon processing facilities, sensors for sensing physical measurements for the process being run (e.g., pressure, temperature, motion, fluid level, fluid flow, etc.) and instruments performing control output actions (e.g., control valves, actuators, or drive units) for the processing units in the industrial process control environment may be located across a large geographic area. These instruments are generally referred to as "field devices" or "field instruments" (hereafter "field devices") and can include various types of sensors.

Contemporary field devices are generally termed "smart" field devices because these devices can provide valuable asset data besides the basic sensor or control function for a physical parameter. Smart field devices may include sensors such as angle or position sensors, which are widely used in industrial processing facilities for the detection of the angle or position of actuators used for process flow control. Higher energy efficiency, increasing demands on the combustion process and stricter limits for permissible emission values require, however, new high-resolution actuators. A component of these actuators can involve exact position detection. By detecting the exact position (and/or angle) of an actuator, it may be possible to adjust volume flows more precisely than before. In addition, a user can now receive a current position feedback of the actuator at any time.

Conventional angle or position sensors and sensing systems cannot accurately measure the position of driver/actuator exactly. In addition, such conventional approaches are unable to facilitate the measurement of the absolute position directly at the movable element of the actuator.

Some angle or position sensing or detecting systems may use resonance based inductive measuring as a basis for determining an angle or position of an actuator or other element. In conventional resonance based inductive measuring systems, however, the position sensor used, which can contain a resonant circuit, is passively excited by a field. This can result in a number of problems. For example, while a field can excite the resonant circuit, measurements may not be carried out because the measuring signal can be influenced by the excitation signal. This limits the sampling rate of the sensor.

Furthermore, the resonant circuit of the position indicator must have a high Q-factor and is therefore often large. The excitation signal must hit exactly the resonant frequency of the oscillating circuit. If this deviates, the oscillation amplitude is lower, which can lead to a decrease in the signal strength of the measurement signal. In addition, there is a phase shift between the excitation signal and the measurement signal, which must first be measured exactly for demodulation. The energy of the resonant circuit is limited by this passive method, which limits the distance between the position indicator and the sensor circuit board and also can cause problems with foreign material such as metal between the two components.

Furthermore, in safety-critical industrial processes (e.g. industrial process heating with gas), a fail-safe position or angle feedback is often required for process control or monitoring. The ability to detect and measure the position or angle of an actuator in a fail-safe manner is also critical to operations in industrial facilities.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for a sensor for position or angle detection with respect to an actuator using sensor measurements based on inductive resonance.

It is another aspect of the disclosed embodiments to provide for methods and systems for fail-safe operation of a position or angle sensor based on inductive resonance.

It is a further aspect of the disclosed embodiments to provide for a sensor method and system based on inductive resonance and including an oscillator with coupled inductances.

The aforementioned aspects and other objectives can now be achieved as described herein. In an embodiment, a sensor system can include an indicator comprising an oscillating circuit that is operable in resonance, an indicator that is connected to a movable element of an actuator, and a sensor PCB comprising sensor windings, wherein the sensor PCB with the sensor windings are arranged in direct proximity to the at least one indicator and external to a closed housing, wherein the sensor PCB receives a position or an angle of the at least one indicator, and measures a position or an angle of the movable element inside the actuator through the closed housing based on inductive resonance facilitated by the oscillating circuit.

In an embodiment, a resulting electromagnetic field of the oscillating circuit can induce signals, dependent on the position or an angle of the oscillating circuit, into the sensor windings of the sensor PCB.

In an embodiment, the sensor PCB can be located outside of a medium space that is contained within the closed housing and an indicator can be positioned inside the closed housing and can be mounted in the medium space.

In an embodiment, the actuator comprises a moveable actuating element and wherein the at least one indicator comprises at least one position indicator attached to the moveable actuating element.

In an embodiment, the at least one indicator can comprise at least two position indicators attached to the moveable actuating element in a manner in which a defined distance or a defined angle results between the at least two position indicators.

In an embodiment, the at least two position indicators can be dimensioned so that respective resonance frequencies differ from one another.

In an embodiment, the signals from the at least two position indicators can be processed with at least one signal conditioning circuit.

In an embodiment, the at least one indicator can comprise a position indicator or an angle indicator that can operate without auxiliary power or which can be additionally supplied with auxiliary power to increase the electromagnetic field of the at least one indicator for measurement through the closed housing or for measurement about a larger distance between a sensor PCB and the at least one indicator.

In an embodiment, the oscillating circuit can comprise an inductive resonance circuit, and the inductance of the inductive resonance circuit can be coupled to a coil through an amplifying circuit element that can be used to excite the oscillating circuit.

In an embodiment, the phase and the frequency of the inductive resonance circuit can be 'known' to the sensor PCB through the coil, and a measurement signal induced in the sensor windings can comprise a same phase angle as the oscillating signal generated by the oscillator circuit.

In an embodiment, a signal from the oscillator/coil can be converted into a clock signal and used to demodulate the measurement signal.

In an embodiment, a sensor system can include at least one indicator that is operable in resonance. The at least one indicator can be connected to a movable element of an actuator. The sensor system can further include a sensor comprising sensor windings, wherein the sensor with the sensor windings can be arranged in direct proximity to the at least one indicator and external to a closed housing, wherein the sensor can receive a position or an angle of the at least one indicator, and can measure a position or an angle of the movable element inside the actuator through the closed housing based on inductive resonance facilitated by the at least one indicator.

In an embodiment, a method of operating a sensor system can involve: operating an indicator in resonance, wherein the at least one indicator is associated with an actuator, wherein the at least one indicator can be connected to a movable element of the actuator; receiving a position or an angle of the at least one indicator by a sensor comprising sensor windings, wherein the sensor is arranged in direct proximity to the at least one indicator and external to a closed housing; and measuring a position or an angle of the movable element inside the actuator through the closed housing based on inductive resonance facilitated by the at least one indicator.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
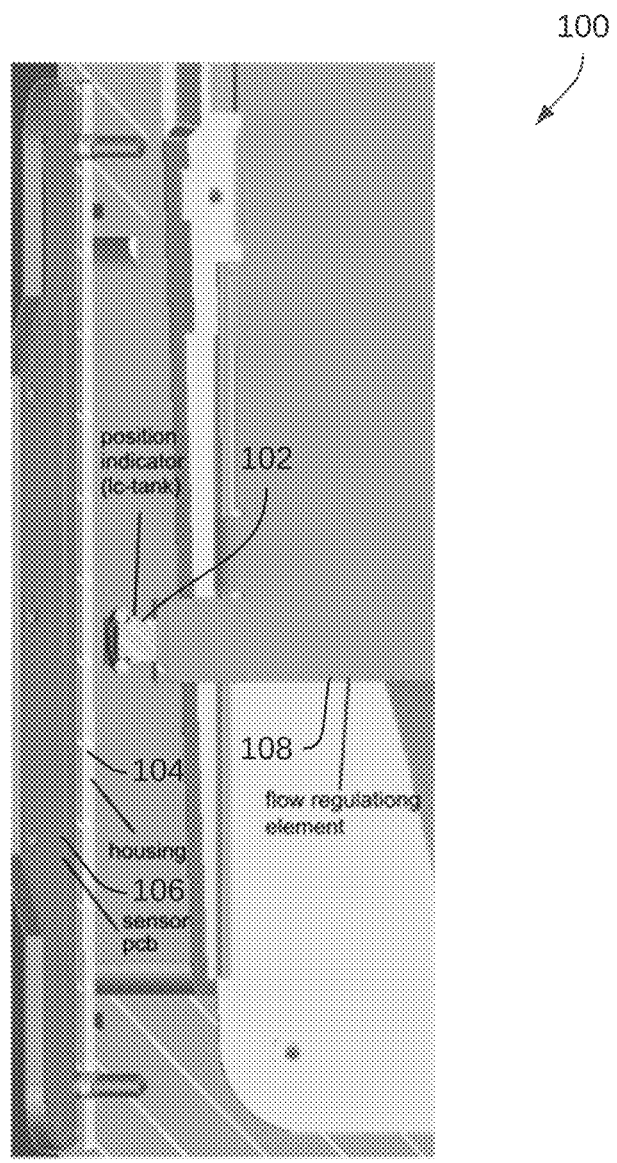
FIG. 1 illustrates a schematic diagram of a sensor system for position or angle detection with respect to an actuator using measurements based on inductive resonance.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments relate to a sensor system, which can be used to measure the exact position of an actuator or drive element. The disclosed approach can enable the absolute position to be measured directly at the movable element of an actuator. With this approach, the volume flow can be adjusted very precisely. The measuring system or sensor system can be designed such that a position indicator can be located on a medium side and a sensor unit can be located outside or external. The embodiments of the sensor systems and related methods disclosed herein can apply to control valves used in process control applications and in particular to sensors that can read position, velocity, and/or rotation.

FIG. 1 illustrates a schematic diagram of a sensor system 100 for position or angle detection with respect to a movable element of an actuator 108 using measurements based on inductive resonance. The sensor system 100 includes an indicator 102, which can function as a position sensor or angle sensor. That is, the indicator 102 (or indicators) can detect the position or angle of an actuator. The indicator 102 may comprise an LC circuit, which can also be referred to as c/c tank, a resonant circuit, a tank circuit or a tuned circuit. The LC circuit is operable as an electrical circuit including an inductor (L) and a capacitor (C) electrically connected to one another. This type of electrical circuit can function as an electrical resonator, storing energy at the circuit's resonant frequency.

The sensor system 100 can further include a sensor PCB (Printed Circuit Board) 106 adjacent to a housing 104. The movable element of the actuator 108 is also shown at the right side of FIG. 1. The movable element of the actuator 108 can function as a flow-regulating element. That is, the actuator 108 can comprise a moving actuator element that can manipulate the medium flow, and the 'medium' may be a fluid (e.g., a gas or a liquid).

The sensor system 100 can be utilized for high-resolution position or angle detection on an actuator using a measuring approach based on inductive resonance. This makes it also possible to measure the exact position or angle directly at the movable element of an actuator. A position or angle indicating element can be mounted directly in the medium space, making it possible to attach the indicator 102 (i.e., the position or angle indicator) directly on the moving actuator element that manipulates the medium flow.

The indicator 102 can be designed in such a manner that it operates completely without auxiliary power or is additionally supplied with auxiliary power. The sensor PCB 106, which can receive the position or angle of the position indicator 102, can be located outside the medium space so that the position of the moving actuator element can be measured through the closed housing 104, which can also be made of metal.

This technology can therefore be used to construct a gas-tight position or angle sensor. A further advantage of this arrangement is that the position can be measured directly on the movable actuator element of the actuator 108 that manipulates the medium flow. Influences such as jamming or sticking of the actuator element, deviations due to component tolerances or the expansion of the material due to the influence of temperature can be measured and compensated.

A basic principle of the sensor system 100 can be characterized by the fact that the sensor system 100 can function according to an inductive resonance method. In this process, the position indicator 102 can include an oscillating circuit (LC tank), which can be operated in resonance. The sensor PCB 106 with sensor windings can be arranged in direct proximity to the position or angle indicator 102. The resulting electromagnetic field of the oscillating circuit can induce signals, dependent on the position of the oscillating circuit, into the sensor windings of the sensor PCB 106. The sensor windings can be arranged such that at least one sine signal and at least one cosine signal can be generated over the entire measuring range. These signals can be fed to a signal conditioning circuit, with which the exact position or angle of the position indicator 102 can be calculated. Note that a combined evaluation of the sine signal and the cosine signal of the coarse coil 112 shown in FIG. 3 and the sine signal and the cosine signal of the fine coil 110 depicted in FIG. 3 can enable a high resolution for position detection or angle detection.

Figure 2:
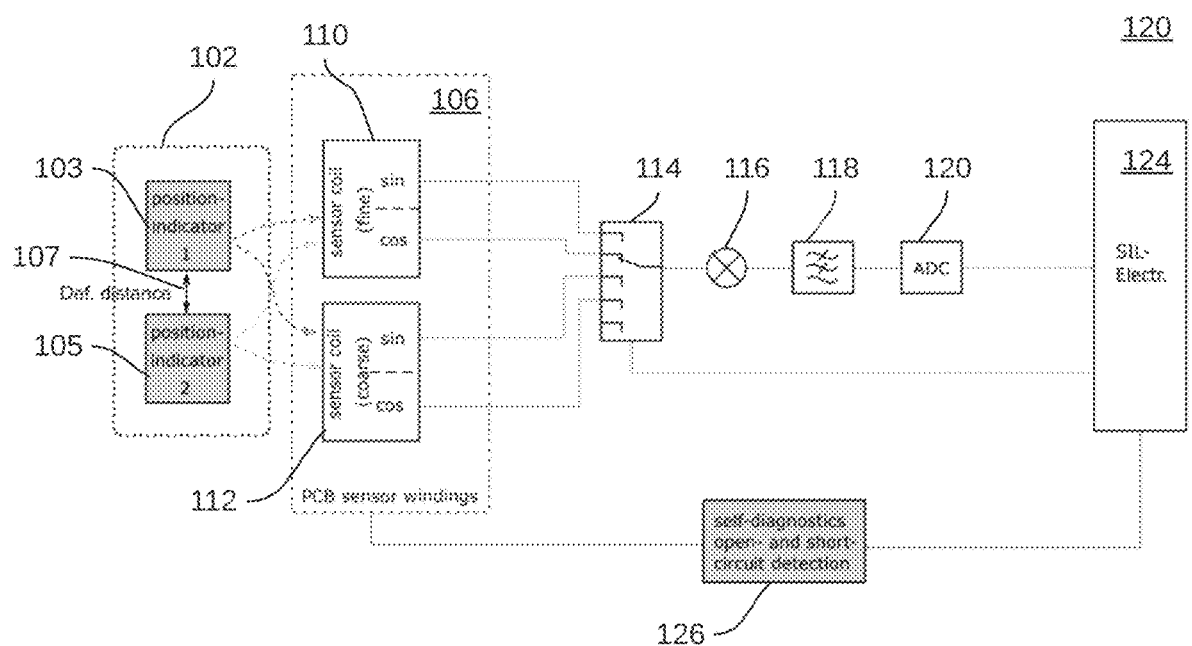
FIG. 2 illustrates a block diagram of a sensor system that implements a fail-safe operation of a position or angle sensor based on an inductive resonance method, in accordance with an embodiment.

FIG. 2 illustrates a block diagram of a sensor system 120 that can implement a fail-safe operation for a position or angle sensor based on inductive resonance, in accordance with an embodiment. Note that as utilized herein, identical or similar reference numerals can refer to identical or similar parts or elements. The sensor system 120 shown in FIG. 2 and the sensor system 130 depicted in FIG. 3 represent alternative embodiments of the sensor system 100 illustrated in FIG. 1.

The sensor system 120 depicted in FIG. 2 includes an indicator 102, which may include one or more position indicators including a first position indicator 103 and a second position indicator 105. The first position indicator 103 can be separated from the second position indicator 105 by a defined distance as indicated by the double arrow 107 shown in FIG. 2 between the first position indicator 103 and the second position indicator 105. It can be appreciated that although two position indicators 103 and 105 are illustrated in FIG. 2, the indicator 102 can be configured with additional position indicators (e.g., a third position indicator, a fourth position indicator, etc.) in other embodiments.

The sensor system 120 can further include the sensor PCB 106, which can also be referred to simply as a 'sensor', and which can include PCB sensor windings comprising one or more sensor coils including a first sensor coil 110 (also referred to as a 'fine coil') and a second sensor coil 112 (also referred to as a 'course coil'). It can be appreciated that in other embodiments, additional coils may be used (e.g., third sensor coil, fourth sensor coil, etc.). The signals of the first sensor coil 110 and the second sensor coil 112 can be selected electronically with a multiplexer 114. The output of the multiplexer 114 can be connected to the mixer 116. The mixer 116 can then output a signal to an LPF (Low Pass Filter) 118, which in turn provides a signal that is fed as input to an ADC (Analog-to-Digital Converter) 120. The signal output from the ADC 120 can be then provided as input to an SIL (Safety Integrity Level) electronic 124. An output signal from the SIL electronic 124 can be then provided as input to an electrical circuit 126 for self-diagnostics open- and short-circuit detection. Output from the electrical circuit 126 can be then provided as input to the sensor PCB 106.

Figure 3:
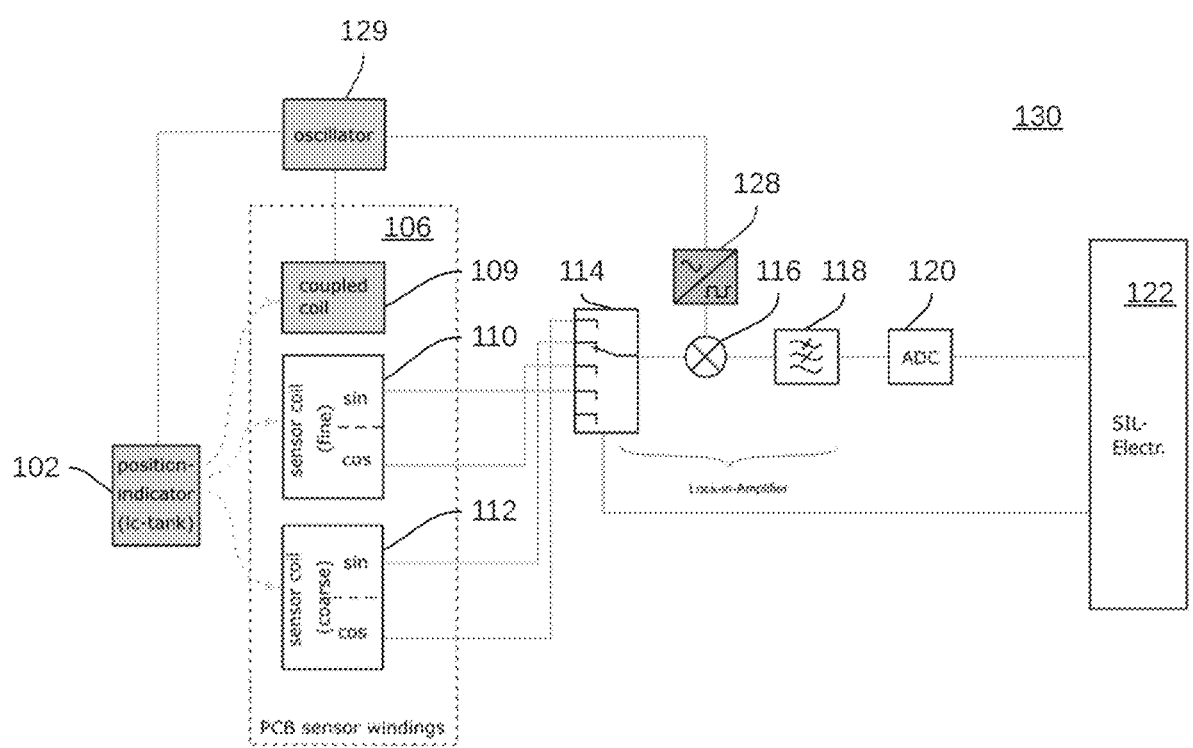
FIG. 3 illustrates a block diagram of a sensor system based on an inductive resonance method and an oscillator with coupled inductances, in accordance with an embodiment.

Note that a combined evaluation of the sine signal and the cosine signal of the coarse coil 112 shown in FIG. 3 and the sine signal and the cosine signal of the fine coil 110 depicted in FIG. 3 can enable a high resolution for position detection or angle detection.

The sensor system 120 can operate as a fail-safe position measurement system. To achieve this, instead of using a single position indicator, two or more position indicators can be used (i.e., the first position indicator 103, the second position indicator 105, and so on). The two position indicators 103 and 105 can be attached to the movable actuating element (e.g., the actuator 108 shown in FIG. 1) in such a manner that a defined distance or a defined angle can result between them. This defined distance, indicated by the double arrow 107 can be used as a basis for the plausibility check.

The two position indicators 103 and 105 can each contain an oscillating circuit and can be dimensioned so that the respective resonance frequencies differ significantly from each other. This can ensure that the position indicators 103 and 105 can be controlled differently from each other and that they do not influence each other. This has the further advantage that the same sensor circuit board (e.g., Sensor PCB 106 can be used for both position indicators 103 and 105 to pick up the measuring signals. By this approach and arrangement, it may also be possible to process the signals of both position indicators 103 and 105 with the same signal conditioning circuit. The two positions of the position indicators 103 and 105 can be read out sequentially one after the other.

Since the principle works with a ratio calculation of the sensor signals, all influencing parameters of the circuit can be automatically canceled out, such as drift, offset, changes in amplification, fluctuations in component values or temperature effects. The subsequently calculated position difference of the first position indicator 103 and the second position indicator 105 can under all circumstances result in the defined distance between the two position indicators 103 and 105. This can ensure that a single-channel signal processing circuit works correctly and that the measured position or angle is valid.

Possible errors or other influences in the signal processing circuit always lead to a change of the defined distance. Errors, which may not be detected by this approach, can be referred to the sensor PCB 106 with the PCB sensor windings. Interruptions or short circuits can be detected by a test performed by the electronics including, for example, the electrical circuit 126 for self-diagnostics open- and short-circuit detection. This can be possible by a simple resistance measurement. Furthermore, a plausibility check can be performed between the signals of the fine sine winding in relation to the fine cosine winding (for high-resolution incremental position determination) and also to the coarse sine and cosine windings (for coarse absolute position determination). These tests can allow all defects of the sensor circuit board to be detected.

The sensor system 120 can thus operate as an inductive resonance-based measuring system in such a manner that the position or angle to be measured can be recorded in a fail-safe manner. The sensor system 120 can thus function as a fail-safe position measuring system. Advantages of such a fail-safe resonance-based system include a comparatively low price, a high resolution and good scalability for the respective application.

FIG. 3 illustrates a block diagram of a sensor system 130 based on an inductive resonance method and an oscillator with coupled inductances, in accordance with an embodiment. As discussed previously, the sensor system 130 depicted in FIG. 3 is an alternative embodiment with respect to embodiments of the sensor system 120 shown in FIG. 2 and the sensor system 100 depicted in FIG. 1.

The sensor system 130 includes some of the same parts or elements discussed previously with respect to the sensor system 100 and the sensor system 120, but with additional or different elements or parts and configuration. The sensor system 130 includes an indicator 102 (lc-tank/position indicator) that communicates electronically with an oscillator circuit 129. The sensor system 130 further includes a sensor PCB 106. Note that the sensor PCB 106 shown in FIG. 3 is slightly different from the arrangement depicted in FIG. 2. That is, as illustrated in FIG. 3, the sensor PCB 106 ('sensor) includes the first sensor coil 110 and the second sensor coil 112. The sensor PCB 106 depicted in FIG. 3 additionally includes, however, a coupled coil 109. The oscillator circuit 129 can be electronically connected to the coupled coil 109 of the sensor PCB 106. An additional circuit element not shown in the arrangement of the sensor system 120 in FIG. 2 is the comparator 128, which receives as input a signal output from the oscillator circuit 129 and then outputs a signal to the mixer 116.

The sensor system 130 can operate as an inductive position or angle measuring system based on an inductive resonance method. A resonant circuit (LC-tank) is used as the position indicator 102. In order to operate it in resonance, unlike in conventional circuits, the resonant circuit is not passively excited by a field, but is actively excited by the oscillator circuit 129. This has the advantage that significantly more energy can be available and this can generate a stronger field. This also can allow for measurements through thin metallic housings or for measurements about bigger distances between the sensor PCB and the indicator.

Note that oscillator circuit 129 (e.g., a Meissner oscillator) can be used in the sensor system 130 because the inductance of the resonant circuit can be coupled to a further inductance, with which the amplifying element (e.g., a transistor) can be controlled. The coupled inductor can be located on the same circuit board on which the sensor windings for signal acquisition are also applied. As a result of this coupling, the phase information and the frequency of the resonant circuit are also known on the sensor circuit board. This is advantageous because the measurement signal induced in the sensor windings has the same phase angle as the oscillator signal. Both signals are in phase. This significantly simplifies the demodulation of the amplitude-modulated measurement signal.

The signal from the coupled coil 109 can now be converted into a clock signal using a comparator and can be used directly to demodulate the measurement signal using a lock-in amplifier. Any changes in the frequency-determining components of the resonant circuit and the resulting deviation in the resonance frequency are corrected by this method. The resonant circuit can be operated in its optimal working point, which can guarantee maximum measurement signal amplitude.

As discussed previously, in conventional systems with passive excitation of the resonant circuit, a change in the resonance frequency can lead to a decrease in the amplitude of the oscillation signal and thus to a measurement signal with a lower amplitude. A change in the resonance frequency may also lead to problems with the demodulation of the measurement signal and thus to signal deviations. In approach shown in FIG. 3, the signal to control the demodulator can automatically adjust when the resonance frequency or phase position changes. This can ensure that the sensor system 130 always can operate at the optimum operating point.

The embodiment illustrated in FIG. 3 can thus operate as inductive sensor that can improve the operating behavior of the sensor and simplify the evaluation of the measurement signals. Compared to conventional approaches, where these types of sensors are passively excited by an electric field, the following advantages result. For example, phase information and oscillation frequency can be available, so that a demodulation of the measuring signal is more easily obtained. Furthermore, automatic operation at the ideal operating point (influences on the frequency determining components have no influence) can result from the approach shown in FIG. 3. In addition, a stronger measurement signal can be available with measurement also possible through a metallic object or concerning larger/longer distances between the sensor PCB and the indicator. Additionally, time continuous measurement is now made possible, resulting in a higher sampling rate.

A possible disadvantage of the embodiment shown in FIG. 3 is that a two-pole electrical connection to the position indicator (oscillating circuit) may be required, but this can be designed as a cable connection or as a sliding contact, for example.

The sensor system 130 shown in FIG. 3 can be used in resonance-based inductive measuring systems. The sensor system 130 can be implemented as a low-cost and high-precision measuring system, which can be adapted or scaled to almost all applications where it is necessary to record a movement (e.g., rotary and linear).

Although the operations of the system(s) and method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations of the systems and method described herein may be implemented using software instructions stored on a computer useable storage medium for execution by a computer including, for example, a microcontroller as discussed herein. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments of the invention may be implemented entirely in hardware or in an implementation containing both hardware and software elements. In embodiments that do utilize software, the software may include but is not limited to firmware, resident software, microcode, etc. Example implementations of the embodiments can include a hardware device with some embedded software for measuring/detecting and transmitting data (e.g. temperature, pressure, motion). Other example implementations of the embodiments may include embedded software that runs in a device/unit (e.g., firmware).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A sensor system, comprising:
   at least one indicator comprising an oscillating circuit that is operable in resonance;
   the at least one indicator connected to a movable element of an actuator; and
   a sensor PCB comprising sensor windings, wherein the sensor PCB with the sensor windings is arranged in direct proximity to the at least one indicator and external to a closed housing, wherein the sensor PCB receives a position or an angle of the at least one indicator, and measures a position or an angle of the movable element inside the actuator through the closed housing based on inductive resonance facilitated by the oscillating circuit, wherein:
   the at least one indicator comprises at least two position indicators attached to the moveable actuating element, wherein a predefined distance or a predefined angle exists between the at least two position indicators;
   the at least two position indicators are dimensioned so that respective resonance frequencies differ from one another; and
   at least one signal conditioning circuit processes signals from the at least two position indicators.

2. The sensor system of claim 1 wherein a resulting electromagnetic field of the oscillating circuit induces signals, dependent on a position or an angle of the oscillating circuit, into the sensor windings of the sensor PCB.

3. The sensor system of claim 1 wherein the sensor PCB is located outside of a medium space that is contained within the closed housing and wherein the at least one indicator is positioned inside the closed housing and is mounted in the medium space.

4. The sensor system of claim 1 wherein the actuator comprises the moveable actuating element and wherein the at least one indicator comprises at least one position indicator attached to the moveable actuating element.

5. The sensor system of claim 1 wherein the at least one indicator comprises a position indicator or an angle indicator that operates without auxiliary power or is additionally supplied with auxiliary power to increase an electromagnetic field of the at least one indicator for measurement through the closed housing or for ensuring that the electromagnetic field of the at least one indicator travels a distance between the sensor PCB and the at least one indicator, wherein the electromagnetic field is measured by the sensor PCB.

6. The sensor system of claim 1 wherein:
   the oscillating circuit comprises an inductive resonance circuit;
   an inductance of the inductive resonance circuit is coupled to a coil through an amplifying circuit element;
   a phase and a frequency of the inductive resonance circuit is known to the sensor PCB through the coil;
   a measurement signal induced in the sensor windings comprises a same phase angle as an oscillator signal generated by the oscillator circuit; and
   a signal from the coil is converted into a clock signal and used to demodulate the measurement signal.

7. A sensor system, comprising:
   at least one indicator operable in resonance;
   the at least one indicator connected to a moveable element of an actuator; and
   a sensor comprising sensor windings, wherein the sensor with the sensor windings is arranged in direct proximity to the at least one indicator and external to a closed housing, wherein the sensor receives a position or an angle of the at least one indicator, and measures a position or an angle of the movable element inside the actuator through the closed housing based on inductive resonance facilitated by the at least one indicator, wherein:
   the at least one indicator comprises at least two position indicators attached to the moveable actuating element, wherein a predefined distance or a predefined angle exists between the at least two position indicators;

the at least two position indicators are dimensioned so that respective resonance frequencies differ from one another; and at least one signal conditioning circuit processes signals from the at least two position indicators.

8. The sensor system of claim 7 wherein a resulting electromagnetic field of the at least one indicator induces signals, dependent on a position or an angle of the at least one indicator, into the sensor windings of the sensor.

9. The sensor system of claim 7 wherein the sensor is located outside of a medium space that is contained within the closed housing and wherein the at least one indicator is positioned inside the closed housing and is mounted in the medium space.

10. The sensor system of claim 7 wherein the actuator comprises the moveable actuating element and wherein the at least one indicator comprises at least one position indicator attached to the moveable actuating element.

11. The sensor system of claim 7 wherein the at least one indicator comprises a position indicator or an angle indicator that operates without auxiliary power or is additionally supplied with auxiliary power to increase an electromagnetic field of the at least one indicator for measurement through the closed housing or for ensuring that the electromagnetic field of the at least one indicator travels a distance between the sensor PCB and the at least one indicator so that the electromagnetic field is measured by the sensor PCB.

12. The sensor system of claim 7 wherein:

the at least one indicator comprises an oscillating circuit comprising an inductive resonance circuit;

an inductance of the inductive resonance circuit is coupled to a coil through an amplifying circuit element;

a phase and a frequency of the inductive resonance circuit is known to the sensor through the coil;

a measurement signal induced in the sensor windings comprises a same phase angle as an oscillator signal generated by the oscillator circuit; and a signal from the coil is converted into a clock signal and used to demodulate the measurement signal.

13. A method of operating a sensor system, the method comprising:

operating at least one indicator in resonance, wherein the at least one indicator is associated with an actuator, wherein the at least one indicator is connected to a movable element of the actuator;

receiving a position or an angle of the at least one indicator by a sensor comprising sensor windings, wherein the sensor is arranged in direct proximity to the at least one indicator and external to a closed housing;

measuring a position or an angle of the movable element inside the actuator through the closed housing based on inductive resonance facilitated by the at least one indicator, wherein the at least one indicator comprises at least two position indicators attached to the moveable actuating element, wherein a predefined distance or a predefined angle exists between the at least two position indicators, and wherein the at least two position indicators are dimensioned so that respective resonance frequencies differ from one another; and processing signals from the at least two position indicators with at least one signal conditioning circuit.

14. The method of claim 13 wherein a resulting electromagnetic field of the at least one indicator induces signals, dependent on a position or an angle of the at least one indicator, into the sensor windings of the sensor.

15. The method of claim 13 wherein the sensor is located outside of a medium space that is contained within the closed housing and wherein the at least one indicator is positioned inside the closed housing and is mounted in the medium space.

16. The method of claim 13 wherein the actuator comprises the moveable actuating element and wherein the at least one indicator comprises at least one position indicator attached to the moveable actuating element.

17. The method of claim 14 wherein the at least one indicator comprises a position indicator or an angle indicator that operates without auxiliary power or is additionally supplied with auxiliary power to increase an electromagnetic field of the at least one indicator for measurement through the closed housing or for ensuring that the electromagnetic field of the at least one indicator travels a distance between the sensor PCB and the at least one indicator to facilitate measuring of the electromagnetic field by the sensor PCB.

18. The method of claim 13 wherein the sensor is located outside of a medium space that is contained within the closed housing.

19. The method of claim 13 wherein the at least one indicator is positioned inside the closed housing and is mounted in a medium space.

* * * * *